(12) United States Patent
Wakabayashi et al.

(10) Patent No.: US 10,443,659 B2
(45) Date of Patent: Oct. 15, 2019

(54) DAMPER DISC ASSEMBLY (71) Applicant: EXEDY Corporation, Neyagawa-shi, Osaka (JP)

(72) Inventors: Hirokazu Wakabayashi, Neyagawa (JP); Yoshitaka Kubota, Neyagawa (JP); Kazuki Hashimoto, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 276 days.

(21) Appl. No.: 15/542,124

(22) PCT Filed: Feb. 5, 2016

(86) PCT No.: PCT/JP2016/053492
§ 371 (c)(1),
(2) Date: Jul. 7, 2017

(87) PCT Pub. No.: WO2016/129519
PCT Pub. Date: Aug. 18, 2016

(65) Prior Publication Data
US 2018/0259001 A1 Sep. 13, 2018

(30) Foreign Application Priority Data
Feb. 9, 2015 (JP) .................... 2015-022986

(51) Int. Cl.
*F16D 3/12* (2006.01)
*F16F 15/134* (2006.01)
(Continued)

(52) U.S. Cl.
CPC ............... *F16D 3/12* (2013.01); *F16D 3/66* (2013.01); *F16D 13/64* (2013.01);
(Continued)

(58) Field of Classification Search
CPC ..... F16D 3/12; F16D 3/66; F16D 13/64; F16D 2300/22; F16D 13/68; F16F 15/134; F16F 15/139; F16F 2232/02
(Continued)

(56) References Cited

U.S. PATENT DOCUMENTS 4,944,499 A 7/1990 Hiromi
5,366,056 A 11/1994 Thomas
(Continued)

FOREIGN PATENT DOCUMENTS

CN 1147066 A 4/1997
CN 102272473 A 12/2011
(Continued)

OTHER PUBLICATIONS

First Office Action of the corresponding Chinese patent application No. 201680005674.8, dated Nov. 2, 2018, 6 pp.
(Continued)

*Primary Examiner* — Greg Binda
(74) *Attorney, Agent, or Firm* — United IP Counselors, LLC (57) ABSTRACT

A clutch disc assembly includes a hub flange, an output hub, an intermediate hub, a plurality of first elastic members, and a plurality of second elastic members. Power from an engine is input into the hub flange. The output hub can be coupled to an input shaft of the transmission. The intermediate hub is arranged between the hub flange and the output hub in a diameter direction such that relative rotation with the hub flange by an angle greater than or equal to a first angular range is prevented, and such that relative rotation with the output hub by an angle greater than or equal to a second angular range is prevented. The plurality of first elastic members couple the hub flange and the intermediate hub elastically in a rotation direction. The plurality of second
(Continued)

elastic members couple the intermediate hub and the output hub elastically in the rotation direction.

4 Claims, 5 Drawing Sheets

(51) Int. Cl.
    *F16F 15/139* (2006.01)
    *F16D 13/64* (2006.01)
    *F16D 3/66* (2006.01)
    *F16F 15/123* (2006.01)
    *F16D 13/68* (2006.01)

(52) U.S. Cl.
    CPC ........ *F16F 15/1238* (2013.01); *F16F 15/134* (2013.01); *F16F 15/139* (2013.01); *F16D 13/68* (2013.01); *F16D 2300/22* (2013.01); *F16F 2232/02* (2013.01)

(58) Field of Classification Search
    USPC .......................... 464/68.8; 192/213.2–213.22
    See application file for complete search history.

(56) References Cited

U.S. PATENT DOCUMENTS

| | | | |
|---|---|---|---|
| 5,725,080 A * | 3/1998 | Lohaus | F16F 15/123 192/213.22 |
| 5,816,925 A | 10/1998 | Hiroshi | |
| 6,029,793 A | 2/2000 | Tanaka et al. | |
| 6,224,487 B1 * | 5/2001 | Yuergens | F16F 15/12366 464/68.8 |
| 7,837,018 B2 * | 11/2010 | Nakamura | F16H 45/02 192/213.21 |

FOREIGN PATENT DOCUMENTS

| | | |
|---|---|---|
| CN | 102678816 A | 9/2012 |
| CN | 103890446 A | 6/2014 |
| DE | 4313944 A1 | 11/1993 |
| DE | 19642913 A1 | 4/1997 |
| FR | 2690959 A1 | 11/1993 |
| GB | 2306619 A | 5/1997 |
| GB | 2318620 A | 4/1998 |
| JP | S6369824 U | 5/1988 |
| JP | H01121744 U | 8/1989 |
| JP | H04341636 A | 11/1992 |
| JP | H0642550 A | 2/1994 |
| JP | H09112570 A | 5/1997 |
| JP | 2002310185 A | 10/2002 |
| JP | 2003278791 A | 10/2003 |
| JP | 2004100963 A | 4/2004 |

OTHER PUBLICATIONS

International Search Report dated Mar. 22, 2016 for corresponding foreign Application No. PCT/JP2016/053492, 2 pp.
International Search Report dated Feb. 23, 2016 for foreign Application No. PCT/JP2015/085627, 2 pp.
First Office Action of the Chinese patent application No. 201580073296. 2, dated Nov. 8, 2018, 7 pp.

* cited by examiner

DAMPER DISC ASSEMBLY

CROSS-REFERENCE TO RELATED APPLICATIONS

This application is the U.S. National Phase of PCT International Application No. PCT/JP2016/053492, filed on Feb. 5, 2016. That application claims priority to Japanese Patent Application No. 2015-022986, filed Feb. 9, 2015. The contents of both applications are herein incorporated by reference in their entirety.

BACKGROUND

Technical Field

The present disclosure relates to a damper disc assembly, and in particular to a damper disc assembly for transmitting power from an engine to an input shaft of a transmission.

Background Art

A damper disc assembly used in a clutch disc assembly or the like includes a pair of input plates, an output hub that has a flange on its outer periphery, and a plurality of torsion springs that couple the pair of input plates to the output hub elastically in a rotation direction. The pair of input plates are fixed to each other in their outer circumferential portions by multiple stop pins. These stop pins are inserted into notches cut out from the outer circumferential edge of the flange that constitutes part of the output hub (see FIG. 2 of Japanese Patent Application No. 2003-278791A).

With this configuration, the pair of input plates and the flange of the output hub can rotate relative to each other in a predetermined angular range, and this relative rotation is prohibited when the stop pins abut against edge portions of the notches.

BRIEF SUMMARY

In a conventional clutch disc assembly, the stop pins need to have a certain diameter, and furthermore need to be arranged on the inner circumferential side of the outer circumferential edges of the pair of input plates. In other words, a considerable amount of space needs to be provided around the flange portion of the output hub in order to configure the stop mechanism.

With this configuration, it is not possible to sufficiently increase the relative torsion angle of the pair of input plates and the flange of the output hub. Also, the space for the torsion springs is limited, and an increase a transmission torque capacity is hindered.

A problem to be solved by the present disclosure is obtaining a damper disc assembly having a stopper mechanism that can easily realize an increase transmission torque capacity and operation over a wider angle.

A damper disc assembly according to one aspect of the present disclosure is for transmitting power from an engine to an input shaft of a transmission, and includes a hub flange, an output hub, an intermediate hub, a plurality of first elastic members, and a plurality of second elastic members. Power from the engine is input to the hub flange. The output hub can be coupled to the input shaft of the transmission. The intermediate hub is arranged between the hub flange and the output hub in a diameter direction such that relative rotation with the hub flange by an angle greater than or equal to a first angular range is prevented, and such that relative rotation with the output hub by an angle greater than or equal to a second angular range is prevented. The plurality of first elastic members couple the hub flange and the intermediate hub elastically in a rotation direction. The plurality of second elastic members couple the intermediate hub and the output hub elastically in the rotation direction.

With this configuration, power from the engine is transmitted to the hub flange, the first elastic members, the intermediate hub, the second elastic members, and the output hub in this order, and is then transmitted to the input shaft of the transmission. Here, the intermediate hub is arranged so as to not rotate relatively to the hub flange and the output hub by angles greater than or equal to respective predetermined angular ranges. In other words, a stopper mechanism is constituted by the intermediate hub along with the hub flange and the output hub.

With this configuration, there is no need to provide a stopper mechanism that includes stop pins in the outer circumferential portion of the flange as in conventional apparatuses. Accordingly, it is possible to ensure a large amount of space for the elastic members, and it is possible to easily realize an increase transmission torque capacity and operation over a wider angle.

The damper disc assembly according to another aspect of the present disclosure further includes: a pair of retaining plates that are arranged on respective sides in an axial direction of the hub flange and the intermediate hub, and are coupled to the intermediate hub so as to not be capable of relative rotation. Also, the plurality of first elastic members elastically couple the hub flange to the pair of retaining plates.

In the damper disc assembly according to yet another aspect of the present disclosure, the hub flange and the intermediate hub are prevented from rotating relative to each other by an angle greater than or equal to the first angular range due to a portion of an inner circumferential portion of the hub flange abutting against a portion of an outer circumferential portion of the intermediate hub. Also, the intermediate hub and the output hub are prevented from rotating relative to each other by an angle greater than or equal to the second angular range due to a portion of an inner circumferential portion of the intermediate hub abutting against a portion of an outer circumferential portion of the output hub.

With this configuration, it is possible to reduce the amount of space occupied by the stopper mechanism.

In the damper disc assembly according to still another aspect of the present disclosure, the hub flange is a ring-shaped plate member and has a plurality of notches formed in an inner circumferential edge with predetermined intervals therebetween in the circumferential direction. Also, the input shaft of the transmission can be coupled to an inner circumferential portion of the output hub, and a plurality of teeth are provided on an outer circumferential portion of the output hub. Also, the intermediate hub is a ring-shaped plate member, an outer circumferential portion of the intermediate hub having a plurality of teeth that are respectively inserted into the notches of the hub flange such that the intermediate hub can rotate relative to the hub flange in the first angular range, and an inner circumferential portion of the intermediate hub having a plurality of notches into which the teeth of the output hub are respectively inserted such that the intermediate hub can rotate relative to the output hub in the second angular range.

The damper disc assembly according to still another aspect of the present disclosure further includes: a hysteresis torque generating mechanism that is for generating hysteresis torque and is provided between the hub flange and at least one of the two retaining plates in an axial direction.

In the present disclosure described above, the damper disc assembly has three hubs, and a stopper mechanism is constituted between these hubs, and therefore there is no need to constitute the stopper mechanism in the outer circumferential portion of the flange of the output hub as in conventional apparatuses, and it is possible to easily realize an increase transmission torque capacity and operation over a wider angle.

DETAILED DESCRIPTION OF EMBODIMENTS

Figure 1:
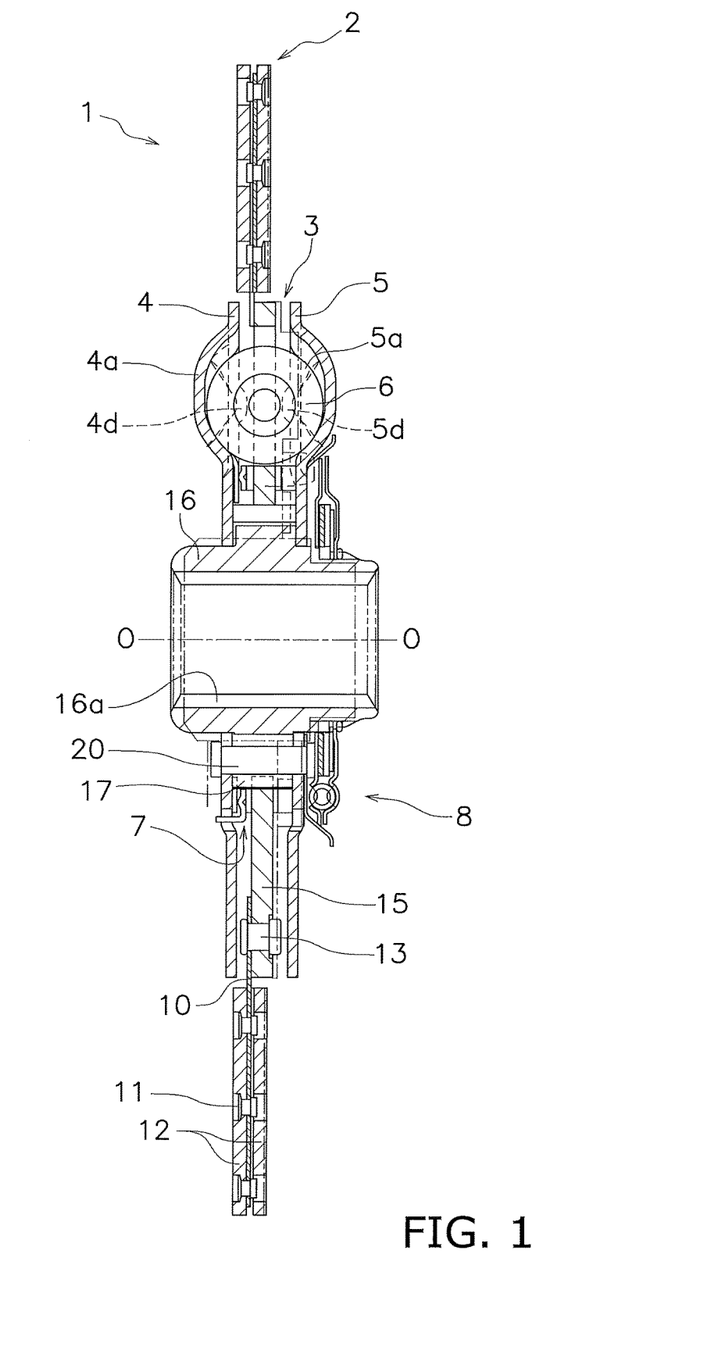
FIG. 1 is a cross-sectional diagram of a clutch disc assembly according to one embodiment of the present disclosure.

A clutch disc assembly 1 serving as one embodiment of the present disclosure is shown in FIG. 1. This clutch disc assembly 1 is an apparatus for transmitting torque from an engine (not shown) arranged on the left side of FIG. 1 to a transmission (not shown) arranged on the right side of FIG. 1, or cutting off such torque. In FIG. 1, O-O indicates the rotation axis of the clutch disc assembly 1.

Overall Configuration

This clutch disc assembly 1 includes a clutch disc 2, a hub unit 3, first and second retaining plates 4 and 5, a plurality of torsion springs 6, a first hysteresis torque generating mechanism 7, and a pre-damper unit 8.

Clutch Disc 2

The clutch disc 2 has a plurality of cushioning plates 10 arranged side-by-side in the circumferential direction, and ring-shaped friction facings 12 that are fixed to the two sides of the cushioning plates 10 by rivets 11. The inner circumferential portions of the cushioning plates 10 are fixed to the outer circumferential portion of the hub unit 3 by rivets 13. Note that a flywheel (not shown) of the engine is arranged on the left side of the friction facings 12 in FIG. 1, and torque from the engine is transmitted to the clutch disc assembly 1 due to the friction facings 12 being pressed against the flywheel.

Hub Unit 3

Figure 2:
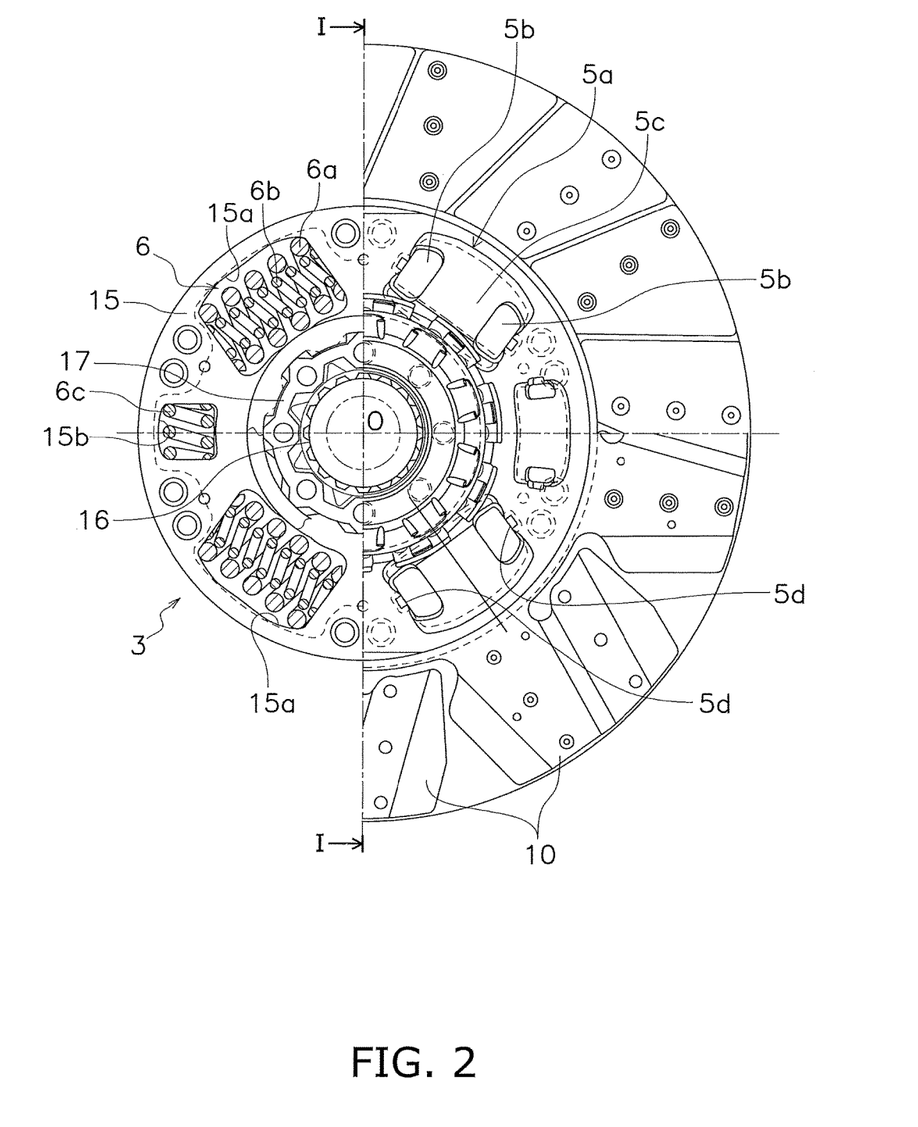
FIG. 2 is a front view of the clutch disc assembly.

As shown in FIGS. 1 and 2, the hub unit 3 is constituted by a hub flange 15, an output hub 16, and a single intermediate hub 17.

Figure 3:
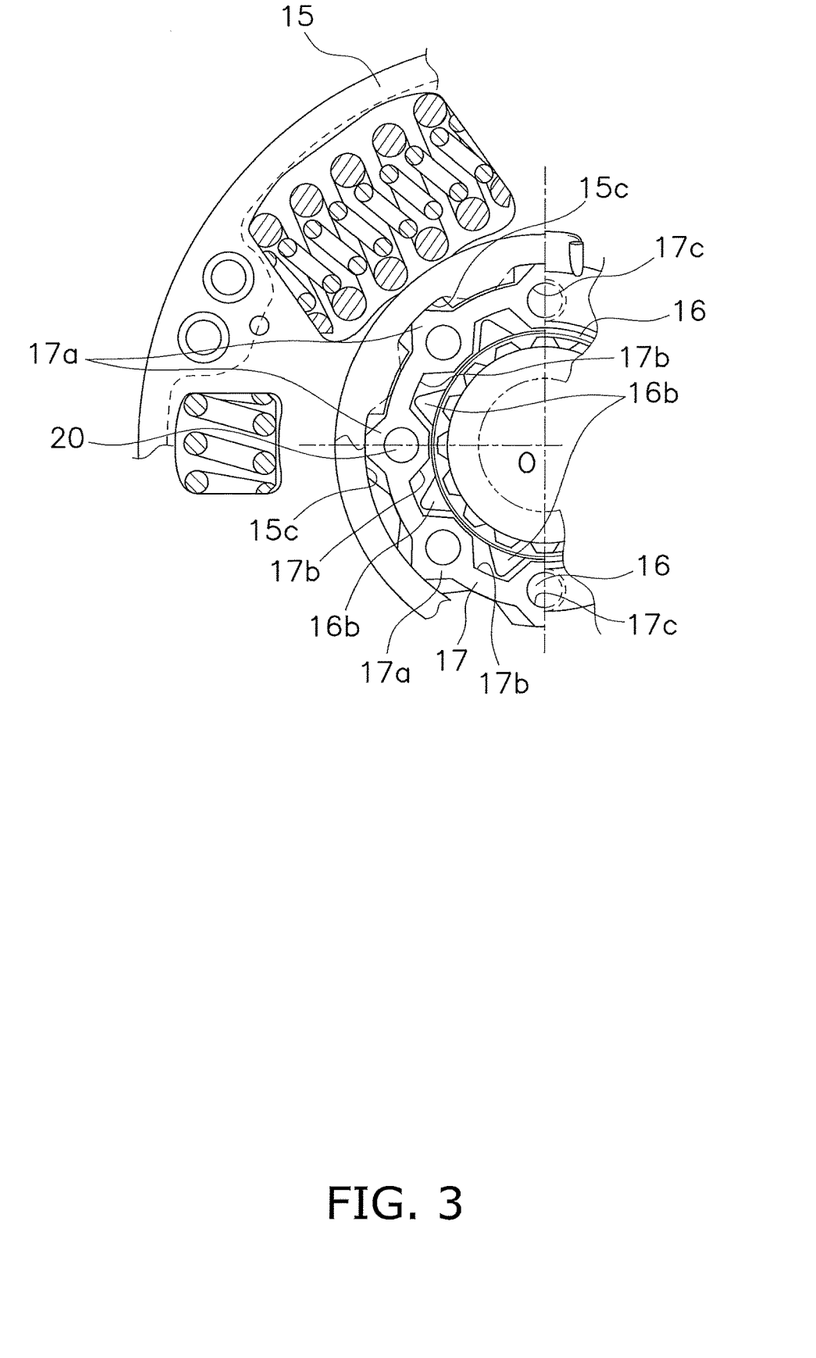
FIG. 3 is an enlarged view of a stopper mechanism in FIG. 2.

The hub flange 15 is a circular disc-shaped plate, and includes four first openings 15a and two second openings 15b that are arranged side-by-side in the circumferential direction. The first openings 15a are larger than the second openings 15b with respect to the diameter direction and the rotation direction, and the two second openings 15b are arranged so as to oppose each other. Also, as shown in FIG. 3, which is an enlarged view of a portion of FIG. 2, notches 15c that are open toward the inner circumferential side are formed in the inner circumferential portion of the hub flange 15 with predetermined intervals therebetween in the circumferential direction.

The output hub 16 is arranged the farthest on the inner circumferential side in the hub unit 3. The output hub 16 is a cylindrical member, and a spline hole 16a is formed in the inner circumferential portion as shown in FIG. 1. The input shaft of the transmission can be spline-fitted into this spline hole 16a. Also, as shown in FIG. 3, teeth 16b are formed on the outer circumferential face of the output hub 16.

The intermediate hub 17 is arranged between the hub flange 15 and the output hub 16 in the diameter direction. The intermediate hub 17 is ring-shaped, and as shown in FIG. 3, teeth 17a are formed on the outer circumferential face, and notches 17b that are open toward the inner circumferential side are formed in the inner circumferential portion.

The teeth 17a of the intermediate hub 17 are inserted into the notches 15c of the hub flange 15. The width of the teeth 17a of the intermediate hub 17 in the rotation direction is smaller than the width of the notches 15c of the hub flange 15 in the rotation direction. Accordingly, an outer circumferential gap is formed between the teeth 17a and the end surfaces of the notches 15c in the rotation direction.

Also, the teeth 16b of the output hub 16 are inserted into the notches 17b of the intermediate hub 17. The width of the teeth 16b of the output hub 16 in the rotation direction is smaller than the width of the notches 17b of the intermediate hub 17 in the rotation direction. Accordingly, an inner circumferential gap is formed between the teeth 16b and the end surfaces of the notches 17b in the rotation direction.

Also, a plurality of holes 17c are formed in the intermediate hub 17, and later-described rivets are passed through these holes.

According to the configuration described above, the output hub 16 and the intermediate hub 17 are prevented from rotating relative to each other by an angle that is greater than or equal to a first angular range corresponding to the inner circumferential gap. Also, the hub flange 15 and the intermediate hub 17 are prevented from rotating relative to each other by an angle that is greater than or equal to a second angular range corresponding to the outer circumferential gap.

Retaining Plates 4 and 5

The first and second retaining plates 4 and 5 are shaped as circular discs, and are arranged opposing each other with the hub unit 3 therebetween. Also, these retaining plates 4 and 5 are fixed by rivets 20 so as to not be capable of rotating relative to each other. Note that as previously described, the rivets 20 are passed through the through-holes 17c of the intermediate hub 17.

As shown in FIGS. 1 and 2, housing portions 4a and 5a for housing torsion springs 6 are formed in mutually opposing portions of the retaining plates 4 and 5. Openings 4b and 5b are formed in the two end portions in the rotation direction of the housing portions 4a and 5a (see FIG. 2; only the second retaining plate 5 is shown in FIG. 2), and connection portions 4c and 5c that connect the outer circumferential side to the inner circumferential side are formed in the central portions in the rotation direction of the housing portions 4a and 5a (see FIG. 2; only the second retaining plate 5 is shown in FIG. 2). Also, engaging portions 4d and 5d that engage with the two end portions in the rotation direction of the torsion springs 6 are formed in the two end portions in the rotation direction of the housing portions 4a and 5a.

Torsion Springs 6

Torsion springs 6 are arranged in the first openings 15a and the second openings 15b of the hub flange 15, and are housed in the housing portions 4a and 5a of the first and second retaining plates 4 and 5 as previously described. Note that the torsion springs 6 that are arranged in the first openings 15a are constituted by a large coil spring 6a having a large coil diameter, and a small coil spring 6b that is inserted into the inner circumferential portion of the large coil spring 6a. Also, torsion springs 6c that are arranged in the second openings 15b are coil springs that have a higher rigidity than the large coil springs 6a and the small coil springs 6b.

First Hysteresis Torque Generating Mechanism 7

Figure 4:
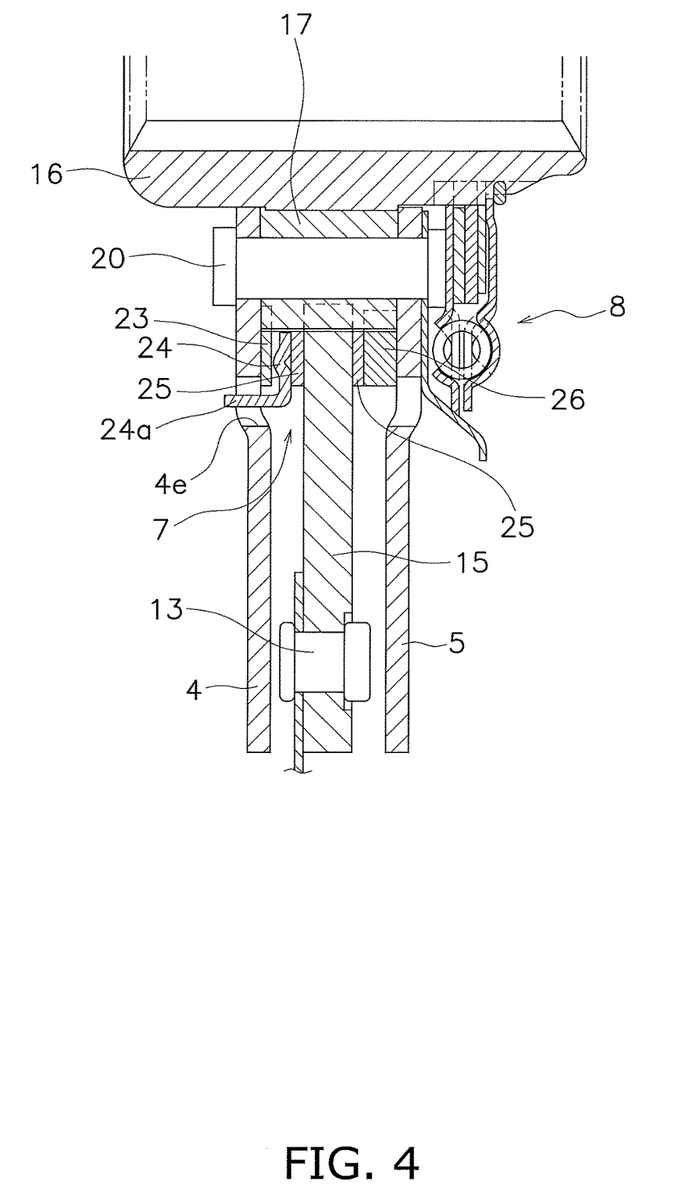
FIG. 4 is an enlarged view of a hysteresis torque generating mechanism in FIG. 1.

As shown in FIG. 4, which in an enlarged view of a portion of FIG. 1, the first hysteresis torque generating mechanism 7 is arranged between the inner circumferential portion of the hub flange 15 and the first retaining plate 4, and between the inner circumferential portion of the hub flange 15 and second retaining plate 5. This first hysteresis torque generating mechanism 7 has a cone spring 23, a friction plate 24, two friction washers 25, and a spacer 26.

The cone spring 23, the friction plate 24, and one friction washer 25 are arranged in this order between the first retaining plate 4 and the inner circumferential portion of the hub flange 15. Also, the spacer 26 and one friction washer 25 are arranged in this order between the second retaining plate 5 and the inner circumferential portion of the hub flange 15. Note that an engaging portion 24a that is bent toward the engine is formed in the outer circumferential portion of the friction plate 24. This engaging portion 24a engages with an engagement hole 4e of the first retaining plate 4, thus preventing the friction plate 24 and the first retaining plate 4 from rotating relative to each other.

Pre-Damper Unit 8

Figure 5:
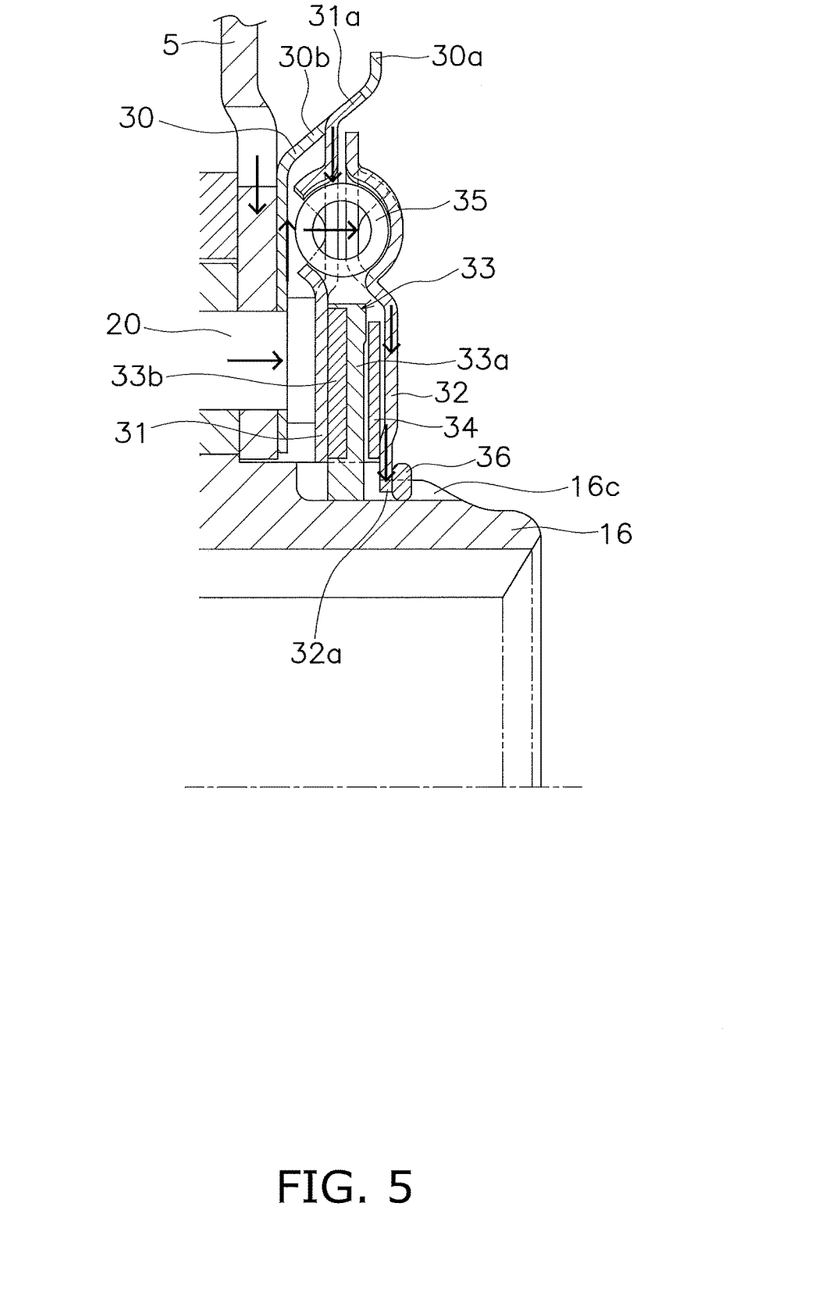
FIG. 5 is an enlarged view of a pre-damper unit.

As shown in FIGS. 1 and 5, the pre-damper unit 8 is arranged at a position that is in the inner circumferential portion of the second retaining plate 5 and in the outer circumferential portion on the transmission side of the output hub 16. Torque is input to the pre-damper unit 8 via a support plate 30. This pre-damper unit 8 has first and second sub plates 31 and 32, a bush unit 33, a cone spring 34, and pre-torsion springs 35. Note that FIG. 5 is an enlarged view of a portion of FIG. 1.

The support plate 30 is a circular disc-shaped member, and is fixed to the side surface on the transmission side of the second retaining plate 5 by rivets 20. An outer circumferential portion 30a of the support plate 30 is bent toward the transmission so as to prevent interference with the housing portions 5a of the second retaining plate 5. A plurality of engagement openings 30b are formed in this outer circumferential portion (bent portion) 30a.

The first sub plate 31 is arranged on the engine side, and the second sub plate 32 is arranged on the transmission side. The first and second sub plates 31 and 32 are both circular disc-shaped, and can rotate relative to each other. The first sub plate 31 has a plurality of engagement claws 31a on the outer circumferential portion, and the engagement claws 31a are engaged with the openings 30b of the bent portion 30a of the support plate 30. Also, the inner circumferential portion of the second sub plate 32 has a spline hole 32a that engages with a spline shaft 16c formed on the outer circumferential face of the output hub 16. Furthermore, the first and second sub plates 31 and 32 have housing portions 31b and 32b for housing the pre-torsion springs 35 in mutually opposing portions. The two ends in the rotation direction of the housing portions 31b and 32b are engaged with the two ends in the rotation direction of the pre-torsion springs 35.

The bush unit 33 and the cone spring 34 are arranged between the first and second sub plates 31 and 32 in the axial direction. The bush unit 33 has a bush main body 33a and a friction washer 33b that is made of resin and is bonded to one side surface of the bush main body 33a. A spline hole for engaging with the spline shaft 16c formed on the outer circumferential face of the output hub 16 is formed in the inner circumferential portion of the bush main body 33a. A second hysteresis torque generating mechanism is configured by the bush unit 33 and the cone spring 34.

Note that a snap ring 36 is provided on the transmission side of the inner circumferential portion of the second sub plate 32. This snap ring 36 prevents the pre-damper unit 8 from falling off to the transmission side.

Operation

When the friction facing 12 is pressed against the flywheel on the engine side, torque from the engine is transmitted to the hub unit 3. This torque is output to a shaft on the transmission side via the following path: hub flange 15→torsion springs 6→first and second retaining plates 4, 5→pre-damper unit 8→output hub 16. Also, the torque transmitted to the first and second retaining plates 4 and 5 is output to the shaft on the transmission via the following path that is different from the above path: intermediate hub 17→output hub 16.

Specifically, during idling for example, when torsional vibration having a small displacement angle is transmitted from the engine side to the clutch disc assembly 1, this torsional vibration is transmitted to the pre-damper unit 8 without being absorbed by the torsion springs 6 or the first hysteresis torque generating mechanism 7. In the pre-damper unit 8, the pre-torsion springs 35 expand/contract, and the first sub plate 31 and the second sub plate 32 rotate relative to each other. Hysteresis torque is thus generated by the second hysteresis torque generating mechanism that is constituted by the bush unit 33 and the cone spring 34, and the torsional vibration having a small displacement angle is attenuated.

Also, when torsional vibration having a large displacement angle is transmitted to the clutch disc assembly 1, the relative rotation angle between the output hub 16 and the intermediate hub 17 increases, and therefore the teeth 16b of the output hub 16 abut against the end surfaces of the notches 17b of the intermediate hub 17, and further relative rotation therebetween is prevented.

When relative rotation of the output hub 16 and the intermediate hub 17 is prevented, the output hub 16 and the intermediate hub 17 rotate integrally, and they rotate relative to the hub flange 15. In this case, the large and small torsion springs 6a and 6b arranged in the first openings 15a expand/contract, and when larger torque is further transmitted, the torsion springs 6c in the second openings 15b expand/contract. The first hysteresis torque generating mechanism 7 thus generates hysteresis torque that is larger than the hysteresis torque generated by the second hysteresis torque generating mechanism. For this reason, torsional vibration having a large displacement angle is effectively attenuated using high rigidity and high friction characteristics.

If the relative torsional angle between the intermediate hub 17 and the hub flange 15 increases even further, the teeth 17a of the intermediate hub 17 abut against the end surfaces of the notches 15c of the hub flange 15, and relative rotation therebetween is prevented.

Features

In the above embodiment, a stopper mechanism is realized by the output hub 16, the intermediate hub 17, and the hub flange 15 abutting against each other. For this reason, there is no need to provide a stopper mechanism that includes stop pins in the outer circumferential portion of the flange as in conventional apparatuses. Accordingly, it is possible to ensure a large amount of space for the torsion springs, and it is possible to easily realize an increase transmission torque capacity and operation over a wider angle.

Other Embodiments

The present disclosure is not limited to the above embodiment, and various modifications and alterations can be made without departing from the scope of the present disclosure.

In the damper disc assembly of the present disclosure, the stopper mechanism is constituted by three hubs, and therefore there is no need to constitute the stopper mechanism in the outer circumferential portion of the flange of the output hub as in conventional apparatuses, and it is possible to easily realize an increase transmission torque capacity and operation over a wider angle.

REFERENCE SIGNS LIST

1 Clutch disc assembly
2 Clutch disc
3 Hub unit
4, 5 Retaining plate
6, 35 Torsion spring
7 First hysteresis torque generating mechanism
8 Pre-damper unit
15 Hub flange
15c Notch
16 Output hub
16b Teeth
17 Intermediate hub
17a Teeth
17b Notch

The invention claimed is:

1. A damper disc assembly for transmitting power from an engine to an input shaft of a transmission, the damper disc assembly comprising:
a hub flange to which power from the engine is input, the hub flange having a plurality of openings;
an output hub coupled to the input shaft of the transmission;
a single ring-shaped intermediate hub arranged between the hub flange and the output hub in a radial direction such that relative rotation with the hub flange by an angle greater than or equal to a first angular range is prevented, and such that relative rotation with the output hub by an angle greater than or equal to a second angular range is prevented;
a pair of retaining plates arranged on respective sides in an axial direction of the hub flange and the intermediate hub, the pair of retaining plates coupled to the intermediate hub such that relative rotation with the intermediate hub is prevented;
a plurality of first elastic members arranged in the plurality of openings of the hub flange, the plurality of first elastic members coupling the hub flange and the pair of retaining plates elastically in a rotation direction; and
a plurality of second elastic members that couple the intermediate hub and the output hub elastically in the rotation direction.

2. The damper disc assembly according to claim 1, wherein the hub flange and the intermediate hub are prevented from rotating relative to each other by an angle greater than or equal to the first angular range due to a portion of an inner circumferential portion of the hub flange abutting against a portion of an outer circumferential portion of the intermediate hub, and
the intermediate hub and the output hub are prevented from rotating relative to each other by an angle greater than or equal to the second angular range due to a portion of an inner circumferential portion of the intermediate hub abutting against a portion of an outer circumferential portion of the output hub.

3. The damper disc assembly according to claim 2, wherein
the hub flange is a ring-shaped plate member and has a plurality of notches formed in an inner circumferential edge with predetermined intervals therebetween in a circumferential direction,
the input shaft of the transmission can be coupled to an inner circumferential portion of the output hub, and a plurality of teeth are provided on an outer circumferential portion of the output hub, and
the intermediate hub is a ring-shaped plate member, an outer circumferential portion of the intermediate hub having a plurality of teeth that are respectively inserted into the notches of the hub flange such that the intermediate hub can rotate relative to the hub flange in the first angular range, and an inner circumferential portion of the intermediate hub having a plurality of notches into which the teeth of the output hub are respectively inserted such that the intermediate hub can rotate relative to the output hub in the second angular range.

4. The damper disc assembly according to claim 1, further comprising:
a hysteresis torque generating mechanism that is for generating hysteresis torque and is provided between the hub flange and at least one of the two retaining plates in the axial direction.

* * * * *